UNITED STATES PATENT OFFICE.

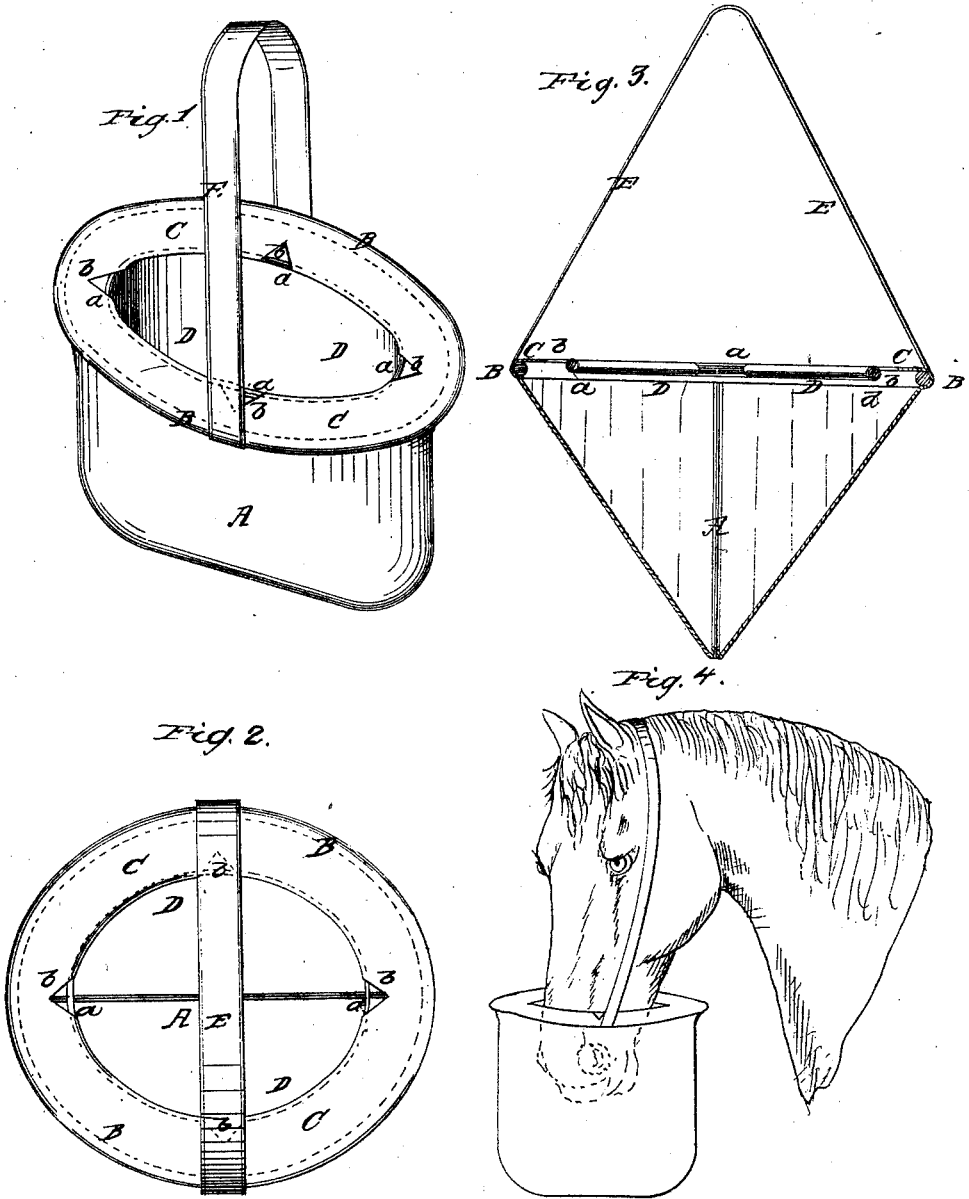

WINDSOR B. WAIT, OF GREENWOOD, ASSIGNOR TO HIMSELF AND JOSEPH A. FAIRBANKS, OF MELROSE, MASSACHUSETTS.

IMPROVED FEED-BAG FOR HORSES OR OTHER ANIMALS.

Specification forming part of Letters Patent No. 37,262, dated December 23, 1862.

*To all whom it may concern:*

Be it known that I, WINDSOR BRUCE WAIT, a citizen of the United States of America, and a resident of Greenwood, in the county of Middlesex and State of Massachusetts, have invented a new and useful or Improved Nose-Bag to be Used in Feeding a Horse or other Animal; and I do hereby declare the same to be fully described in the following specification and represented in the accompanying drawings, of which—

Figure 1 is a perspective elevation of it; Fig. 2, a top view, and Fig. 3 a transverse section, of it. Fig. 4 exhibits it as applied to the head of a horse.

With nose-bags as ordinarily constructed a horse, while feeding from one, has frequently to throw up his head in order to gain access to the grain within the bag. The evil effects resulting from such are not only a loss of more or less of the grain which is liable to be ejected from the mouth of the bag, but an injection of more or less of the grain and dust therefrom into the nostrils of the animal. Such nose bags are generally suspended from the neck of the horse by means of an inelastic strap or neckband.

My improved nose-bag is intended by its construction and operation to avoid the above-mentioned difficulties. For this purpose I not only make it with a head-cap provided with air-inlets and an elastic mouth, but with an elastic hanger or its equivalent. The elastic mouth of the head-cap causes the latter to fit closely and snugly about that part of the head of the animal which may be encompassed by the mouth of the bag, and thus prevents loss of grain in case the animal may throw up his head. The air-inlets permit the entrance of fresh air into the bag and the ejection of the breathed air therefrom. The elastic hanger by its contraction elevates the bag in proportion to the consumption of grain, and thus keeps the grain always within reach of the tongue of the animal.

In the drawings, A denotes the body of the bag, which depends from a metallic hoop, B, to which a head-cap or flange, C, is affixed. This head-cap is a flat annulus, of cloth, leather, or some other suitable material having a like degree of flexibility. This head-cap has a mouth or opening, D, which is bounded by an elastic hoop, belt, or band, $a$. Four or any other suitable number of air-inlets, $b\ b\ b\ b$, are made through the head-cap and next to the mouth and its elastic band, as shown in Fig. 2. They are so arranged as to permit the expansion of the elastic band, and consequently the enlargement of the mouth of the bag, as circumstances may require. The hanger or head-strap E, by which the nose-bag is suspended from the neck of a horse, should be an elastic strap. Elastic webbing may be used for it. Its contractile power when the bag is applied to a horse should be sufficient to draw the bag upward as the food within it may diminish, and to so do this as to keep the food in proper contiguity with or in reach of the tongue of the animal, in order that he may not be obliged to throw up his head to supply himself with the food which may be in the bag.

A bag constructed as described, besides having advantages as above stated, possesses another one of great importance—viz., that of being easily folded or packed in a small compass for transportation.

I claim as my invention—

1. The nose-bag as made either with the head-cap provided with air-inlets $b\ b\ b\ b$, or with the same and an elastic mouth arranged substantially as specified.

2. The nose-bag as made with an elastic hanger, or its equivalent, and in other respects in manner and so to operate substantially as hereinbefore specified.

W. B. WAIT.

Witnesses:
R. H. EDDY,
F. P. HALE, Jr.